(12) United States Patent
Maehara et al.

(10) Patent No.: US 9,528,760 B2
(45) Date of Patent: *Dec. 27, 2016

(54) METHOD FOR PRODUCING POROUS MEMBRANE AND DRYING DEVICE OF POROUS MEMBRANE

(71) Applicant: Mitsubishi Rayon Co., Ltd., Tokyo (JP)

(72) Inventors: Osamu Maehara, Otake (JP); Masaki Kurashina, Otake (JP); Toshinori Sumi, Otake (JP)

(73) Assignee: Mitsubishi Rayon Co., Ltd., Tokyo (JP)

(*) Notice: Subject to any disclaimer, the term of this patent is extended or adjusted under 35 U.S.C. 154(b) by 72 days.

This patent is subject to a terminal disclaimer.

(21) Appl. No.: 14/383,946

(22) PCT Filed: Mar. 12, 2013

(86) PCT No.: PCT/JP2013/056774
§ 371 (c)(1),
(2) Date: Dec. 2, 2014

(87) PCT Pub. No.: WO2013/137237
PCT Pub. Date: Sep. 19, 2013

(65) Prior Publication Data
US 2015/0075027 A1    Mar. 19, 2015

(30) Foreign Application Priority Data
Mar. 12, 2012 (JP) ................. 2012-054450

(51) Int. Cl.
*F26B 21/06* (2006.01)
*F26B 3/00* (2006.01)
(Continued)

(52) U.S. Cl.
CPC ............ *F26B 3/00* (2013.01); *B01D 67/0016* (2013.01); *B01D 67/0095* (2013.01);
(Continued)

(58) Field of Classification Search
CPC ............ F26B 3/00; F26B 19/00; F26B 21/00; F26B 21/06; B01D 67/00; B01D 67/00095; A61F 2/441; A61F 27/16; A61F 27/18
(Continued)

(56) References Cited

U.S. PATENT DOCUMENTS 3,878,104 A * 4/1975 Guerrero ............... B01D 61/08
                                                    210/321.87
5,096,585 A    3/1992 Nguyen
(Continued)

FOREIGN PATENT DOCUMENTS

JP    51-80686 A    7/1976
JP    53-098415 A   8/1978
(Continued)

OTHER PUBLICATIONS

International Search Report dated May 14, 2013, for International application No. PCT/JP2013/056774.
(Continued)

*Primary Examiner* — Stephen M Gravini
(74) *Attorney, Agent, or Firm* — Morgan, Lewis & Bockius LLP

(57) ABSTRACT

The present invention of a method for producing a porous membrane including a solidification step of forming a porous membrane, and a heating step of drying the porous membrane, wherein the heating step includes at least a water reduction step of the porous membrane, the water reduction step uses a heating medium, and the temperature of the heating medium ($T_{gh}$) satisfies a relation of $t_{gh} > T_d$, when $T_d$ represents the heat deformation temperature of a membrane
(Continued)

material. The present invention of a drying device of a porous membrane including a water reduction unit, and a final drying unit, wherein the drying device includes a membrane-surface-temperature measurement means for measuring the surface temperature of the porous membrane and the final drying unit, and a control means for controlling the temperature and/or the flow speed of the heating medium of the water reduction unit.

15 Claims, 8 Drawing Sheets

(51) Int. Cl.
  *B01D 67/00* (2006.01)
  *B01D 69/08* (2006.01)
  *C08J 9/26* (2006.01)
  *F26B 13/00* (2006.01)
  *F26B 21/10* (2006.01)

(52) U.S. Cl.
  CPC .............. *B01D 69/087* (2013.01); *C08J 9/26* (2013.01); *F26B 13/00* (2013.01); *F26B 21/10* (2013.01); *B01D 2323/00* (2013.01); *B01D 2323/42* (2013.01); *C08J 2201/0462* (2013.01); *C08J 2327/16* (2013.01)

(58) Field of Classification Search
  USPC .......... 34/380, 381, 413, 80, 90, 526; 425/6; 264/13; 204/601, 603, 605, 451, 455; 623/17.12, 17.16
  See application file for complete search history.

(56) References Cited

U.S. PATENT DOCUMENTS

| | | | |
|---|---|---|---|
| 5,598,643 A * | 2/1997 | Chuang | D21F 5/143 34/406 |
| 6,692,528 B2 * | 2/2004 | Ward | A61F 2/441 623/17.12 |
| 7,476,293 B2 * | 1/2009 | Herman | D21F 5/182 162/205 |
| 7,966,746 B2 * | 6/2011 | Py | F26B 5/06 34/285 |
| 8,904,668 B2 * | 12/2014 | Priebe | F26B 3/22 101/450.1 |
| 9,074,816 B2 * | 7/2015 | Priebe | F26B 3/22 |
| 2013/0292867 A1 * | 11/2013 | Hiraoka | B01D 67/0088 264/49 |
| 2014/0154495 A1 * | 6/2014 | Hiraoka | B01D 65/102 428/311.11 |
| 2015/0075027 A1 * | 3/2015 | Maehara | B01D 67/0016 34/381 |

FOREIGN PATENT DOCUMENTS

| | | |
|---|---|---|
| JP | 54-151573 | 11/1979 |
| JP | 56-049011 A | 5/1981 |
| JP | 02-216211 A | 8/1990 |
| JP | 02-054132 B2 | 11/1990 |
| JP | 07-252721 A | 10/1995 |
| JP | 07-313854 | 12/1995 |
| JP | 2005-042074 A | 2/2005 |
| JP | 2005-087945 A | 4/2005 |
| JP | 2005-220202 A | 8/2005 |
| JP | 2005-270739 A | 10/2005 |
| JP | 2006-231276 A | 9/2006 |
| JP | 2007-231433 A | 9/2007 |
| JP | 2008-161755 A | 7/2008 |
| JP | 2008-208480 A | 9/2008 |
| JP | 2008-237987 A | 10/2008 |
| JP | 2010-046587 A | 3/2010 |
| JP | 2010-149044 A | 7/2010 |
| JP | 2012-254391 A | 12/2012 |
| JP | 2013-137237 | * 11/2013 |
| JP | 5585727 | * 10/2014 |
| KR | 10-2014-0143789 | * 12/2014 |
| WO | 2010-123094 A1 | 10/2010 |

OTHER PUBLICATIONS

Office Action issued in related U.S. Appl. No. 13/881,232 dated Aug. 9, 2016.
Office Action issued in related U.S. Appl. No. 13/881,232 dated Mar. 29, 2016.
International Search Report issued in related application PCT/JP2011/075009 dated Jan. 24, 2012.
Baker, Richard W.; "Membrane Technology and Applications", John Wiley and Sons, Jan. 1, 2004, Second Edition, p. 104 (three pages) (in English—cited in the Extended European Search Report).
Extended European Search Report issued in related European Patent Application No. 11836477.7 dated Sep. 9 2016 (in English).
Office Action issued in related Japanese Patent Application No. 2015-188842 dated Jun. 21, 2016.

* cited by examiner

METHOD FOR PRODUCING POROUS MEMBRANE AND DRYING DEVICE OF POROUS MEMBRANE

TECHNICAL FIELD

The present invention relates to a method for producing a porous membrane and a drying device of a porous membrane suitably used for the production method.

Priority is claimed on Japanese Patent Application No. 2012-054450, filed on Mar. 12, 2012, the content of which is incorporated herein by reference.

BACKGROUND ART

In recent years, due to the rise of an interest in environmental pollution and the tightening of environmental regulations, a method using a filtration membrane, which is excellent in the completeness of separation, compactness, or the like, has come into the spotlight as a water treatment method.

A nonsolvent-phase separation method, which uses a nonsolvent-phase separation phenomenon making a porous by the phase separation of the polymer solution using a nonsolvent, is known as a method of producing a porous membrane used as a filtration membrane.

A wet or dry-wet spinning method (hereinafter, both spinning methods are collectively called as wet spinning) is known as the nonsolvent-phase separation method. According to this method, a porous membrane that has a large amount of filtrating flow rate, includes a good fractional layer, and is suitable for the treatment of a large amount of water is easily obtained.

When a porous membrane is produced by this wet spinning, a membrane-forming solution containing a hydrophobic polymer, a hydrophilic polymer, and a solvent is prepared first. Incidentally, the membrane-forming solution is discharged in an annular shape, and a porous membrane is formed by a solidification step of solidifying the membrane-forming solution in a solidification solution. Meanwhile, even though the membrane-forming solution may be introduced into the solidification solution via a free-running portion where the membrane-forming solution comes into contact with air (dry-wet spinning method), and may be directly introduced into the solidification solution (wet spinning method).

Since a hydrophilic polymer generally remains in porous portions of the porous membrane in the form of a solution, the porous membrane is dried after the hydrophilic polymer is eliminated by cleaning or the like.

For example, Patent Document 1 discloses a method of drying a porous membrane by a hot air circulation-type drying device as a method of drying the porous membrane. Specifically, a drying device in which hot air having a temperature, which is 60° C. or more and equal to or lower than the heat deformation temperature of a hydrophobic polymer, circulates employs a method of drying a porous membrane by allowing the porous membrane to continuously travel and sending hot air to the outer peripheral side of the porous membrane.

CITATION LIST

Patent Document

Patent Document 1: JP 2005-220202 A

DISCLOSURE OF THE INVENTION

Problem to be Solved by the Invention

However, in order to sufficiently dry a porous membrane by a hot air circulation-type drying device disclosed in Patent Document 1, it is necessary to lengthen the time of stay of a porous membrane in the drying device by reciprocating the porous membrane in the drying device several times and long time is required for drying. Further, since the drying device has a large size, a large installation space is required and a large amount of hot air is also required.

As described above, in the drying method in the related art, it is difficult to dry a porous membrane in a short time without large facilities.

The invention has been made in consideration of the above-mentioned circumstances, and an object of the invention is to provide a method for producing a porous membrane that can efficiently dry a porous membrane in a short time without requiring large facilities, and a drying device that is suitably used in the production method.

Means for Solving Problem

The invention has the following characteristics.

<1> a method for producing a porous membrane comprising:

a solidification step of forming a porous membrane by solidifying a membrane-forming solution by a solidification solution; and a heating step of drying the porous membrane, wherein the heating step includes at least a water reduction step of reducing moisture contained in the porous membrane, the water reduction step uses a heating medium that heats the porous membrane, and the temperature of the heating medium used in the water reduction step satisfies a relation of the following formula (a).

$$t_{gh} > T_d \qquad (a)$$

In formula (a), $t_{gh}$ represents the temperature of the heating medium used in the water reduction step and $T_d$ represents the heat deformation temperature of a membrane material.

<2> the method for producing a porous membrane according to <1>, wherein the heating step includes a final drying step of drying the porous membrane after the water reduction step, the final drying step uses a heating medium that heats the porous membrane, and the temperature of the heating medium used in the final drying step satisfies a relation of the following formula (b).

$$t_{sh} \leq T_d \qquad (b)$$

In formula (b), $t_{sh}$ represents the temperature of the heating medium used in the final drying step and $T_d$ represents the heat deformation temperature of the membrane material.

<3> the method for producing a porous membrane according to claim <1> or <2>, wherein the temperature of the heating medium used in the water reduction step is equal to or higher than a melting point of the membrane material.

<4> the method for producing a porous membrane according to any one of <1> to <3>, wherein the maximum surface temperature of the porous membrane in the water reduction step is lower than the heat deformation temperature ($T_d$) of the membrane material.

<5> the method for producing a porous membrane according to any one of <1> to <4>, wherein the water reduction step reduces moisture contained in the porous membrane until the moisture content of the porous membrane reaches at least 70% or less of initial moisture content.

<6> the method for producing a porous membrane according to any one of <2> to <5>, wherein the maximum surface temperature of the porous membrane in the final drying step satisfies a relation of the following formula (c).

$$T_{gh} < T_{sh} < T_d \qquad (c)$$

In formula (c), $T_{gh}$ represents the maximum surface temperature of the porous membrane in the water reduction step, $T_{sh}$ represents the maximum surface temperature of the porous membrane in the final drying step, and $T_d$ represents the heat deformation temperature of the membrane material.

<7> the method for producing a porous membrane according to any one of <2> to <6>, wherein the temperature of the heating medium used in the final drying step is 120° C. or less.

<8> the method for producing a porous membrane according to any one of <1> to <7>, wherein the moisture content of the porous membrane after the heating step is 1% or less, and a reduction rate of the amount of permeated water is 30% or less.

<9> the method for producing a porous membrane according to any one of <1> to <8>, wherein the surface temperature of the porous membrane after performing the water reduction step is measured, and the temperature and/or the flow speed of the heating medium used in the water reduction step are controlled according to the surface temperature of the porous membrane.

<10> the method for producing a porous membrane according to any one of <2> to <9>, wherein the surface temperature of the porous membrane after performing the final drying step is measured, and the temperature and/or the flow speed of the heating medium used in the final drying step are controlled according to the surface temperature of the porous membrane.

<11> the method for producing a porous membrane according to any one of <2> to <10>, wherein the final drying step dries the porous membrane while regulating the tension of the porous membrane.

<12> a drying device of a porous membrane including a water reduction unit that reduces moisture contained in a porous membrane with a heating medium, and a final drying unit that is provided in the downstream of the water reduction unit and dries the porous membrane with the heating medium, wherein the drying device of a porous membrane includes a membrane-surface-temperature measurement means for measuring the surface temperature of the porous membrane and provided between the water reduction unit and the final drying unit; and a control means for controlling the temperature and/or the flow speed of the heating medium of the water reduction unit according to a measured result of the surface temperature.

<13> the drying device of a porous membrane according to <12>, further comprising:

a membrane-surface-temperature measurement means for measuring the surface temperature of the porous membrane and provided in the downstream of the final drying unit; and a control means for controlling the temperature and/or the flow speed of the heating medium of the final drying unit according to a measured result of the surface temperature.

<14> A drying device comprising:

a water reduction unit that reduces moisture contained in a porous membrane; and a final drying unit that is provided in the downstream of the water reduction unit and dries the porous membrane, wherein the final drying unit includes a control mechanism that regulates the tension of the porous membrane.

Effect of the Invention

According to the invention, it is possible to provide a method for producing a porous membrane that can efficiently dry a porous membrane in a short time without requiring large facilities, and a drying device that is suitably used in the production method.

MODE(S) FOR CARRYING OUT THE INVENTION

Figure 1:
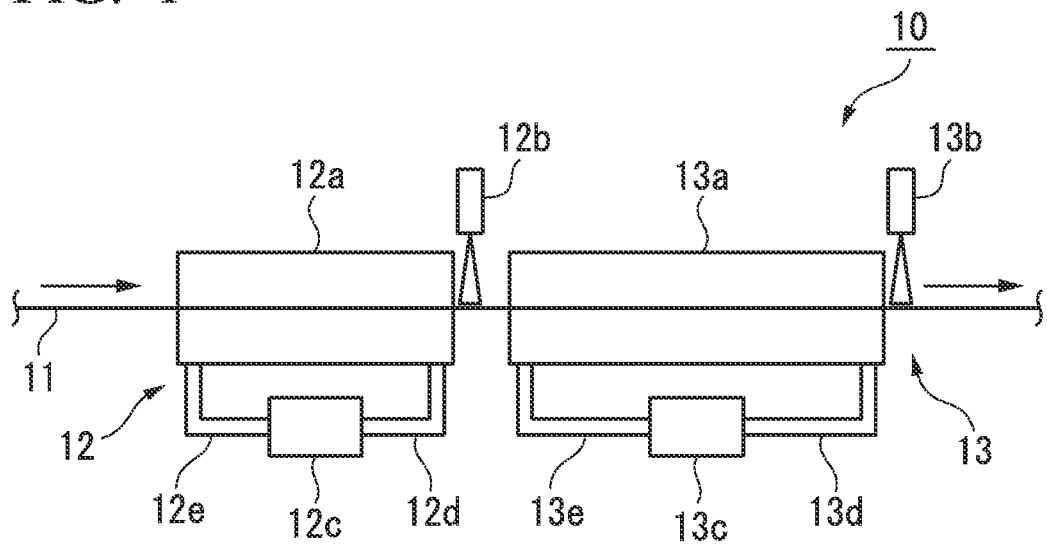
FIG. 1 is a schematic diagram illustrating an example of a drying device of the invention.

A method for producing a porous membrane according to an embodiment of the invention, which including a solidification step of solidifying a membrane-forming solution containing a hydrophobic polymer and a hydrophilic polymer by a solidification solution to form a porous membrane, a removal step of removing the hydrophilic polymer remaining in the formed porous membrane, and a heating step (drying step) of drying the porous membrane from which the hydrophilic polymer has been removed, will be described in detail below.

<Solidification Step>

In the method for producing a porous membrane of this embodiment, a membrane-forming solution containing a hydrophobic polymer and a hydrophilic polymer is prepared first. Then, generally, a porous membrane is formed by a solidification step of discharging the membrane-forming solution into a solidification solution from a nozzle where an annular discharge port is formed and solidifying the membrane-forming solution in the solidification solution.

As long as a hydrophobic polymer can form a porous membrane in the solidification step, the hydrophobic polymer can be used without being particularly limited. However, examples of the hydrophobic polymer include a polysulfone resin, such as polysulfone or polyethersulfone, a fluorine resin, such as polyvinylidene fluoride, polyacrylonitrile, cellulose derivative, polyamide, polyester, polymethacrylate, and polyacrylate. Further, copolymers of these resins may be used, and materials, which are obtained when a substituent is introduced into a part of these resins or the copolymers, may be used. Furthermore, the same kind of polymers having different molecular weights or the like may be blended and used, and two or more kinds of different resins may be mixed and used.

Among them, a fluorine resin, particularly, a copolymer formed of other monomers and a simple substance of vinylidene fluoride or polyvinylidene fluoride has excellent durability against an oxidizing agent such as hypochlorous acid. Accordingly, for example, when a porous membrane to be treated with an oxidizing agent is produced in a removal step or the like to be described below, it is suitable that a fluorine resin be selected as the hydrophobic polymer.

A hydrophilic polymer is to be added to adjust the viscosity of the membrane-forming solution to a range, which is suitable for the formation of the membrane-forming solution, and to stabilize a membrane-forming state. Polyethylene glycol, polyvinylpyrrolidone, or the like is preferably used as the hydrophilic polymer. Among these, polyvinylpyrrolidone or a copolymer in which other monomers are copolymerized with polyvinylpyrrolidone is preferable in terms of the control of the diameter of a hole of a porous membrane or the strength of the porous membrane.

Further, two or more kinds of resins also can be mixed and used as the hydrophilic polymer. For example, when a hydrophilic polymer having a higher molecular weight is used as the hydrophilic polymer, a porous membrane having a good membrane structure tends to be easily formed. Meanwhile, a hydrophilic polymer having a low molecular weight is suitable since being more easily eliminated from the porous membrane in the removal step, which is to be described below, of removing a hydrophilic polymer. Accordingly, the same kind of hydrophilic polymers having different molecular weights may be appropriately blended and used according to a purpose.

It is possible to prepare a membrane-forming solution by mixing the hydrophobic polymer and the hydrophilic polymer, which have been mentioned above, with a solvent (a favorable solvent) in which the hydrophobic polymer and the hydrophilic polymer can be dissolved. Other additive components may be added to the membrane-forming solution as necessary.

The kind of the solvent is not particularly limited. However, when the solidification step is performed in dry-wet spinning, the membrane-forming solution is allowed to absorb moisture at a free-running portion so that the diameter of a hole of the porous membrane is adjusted. Accordingly, it is preferable to select a solvent that can be uniformly mixed with water. Examples of this solvent include N, N-dimethylformamide, N, N-dimethylacetamide, dimethylsulfoxide, N-methyl-2-pyrrolidone, and N-Methylmorpholine N-oxide, and one or more kinds of them can be used as the solvent. Furthermore, a solvent to which a poor solvent of a hydrophobic polymer or a hydrophilic polymer is mixed without the deterioration of the solubility of a hydrophobic polymer or a hydrophilic polymer in a solvent may be used.

The temperature of the membrane-forming solution is not particularly limited, but is generally in the range of 20 to 40° C.

When the concentration of a hydrophobic polymer in the membrane-forming solution is excessively low or high, stability at the time of the formation of a membrane is deteriorated and a suitable porous membrane structure tends to be not easily formed. Accordingly, the lower limit of the concentration of a hydrophobic polymer in the membrane-forming solution is preferably 10 mass % and more preferably 15 mass %. Moreover, the upper limit of the concentration of a hydrophobic polymer in the membrane-forming solution is preferably 30 mass % and more preferably 25 mass %.

Meanwhile, the lower limit of the concentration of the hydrophilic polymer is preferably 1 mass % and more preferably 5 mass % so that the porous membrane is more easily formed. The upper limit of the concentration of the hydrophilic polymer is preferably 20 mass % and more preferably 12 mass % in terms of the handleability of the membrane-forming solution.

When the membrane-forming solution, which is prepared in this way, is discharged from a discharge nozzle or the like and is immersed in the solidification solution, the hydrophobic polymer is solidified. As a result, a hollow fiber-shaped porous membrane made of a hydrophobic polymer and a hydrophilic polymer is obtained. Here, it is inferred that the hydrophilic polymer is in the form of gel and is three-dimensionally tangled with the hydrophobic polymer.

Meanwhile, a free-running section may be provided (dry-wet spinning) and a free-running section may not be provided (wet spinning) between the discharge nozzle and a solidification tank containing the solidification solution.

The solidification solution, which is used here, is a nonsolvent of the hydrophobic polymer, and needs to be a favorable solvent of the hydrophilic polymer. Examples of the solidification solution include water, ethanol, methanol, and a mixture thereof. However, a liquid mixture of water and the solvent used in the membrane-forming solution is preferable in terms of safety and operation management.

Further, the discharge nozzle, which is used here, can be selected according to the form of a porous membrane. For example, when a device including an annular nozzle is used, a hollow fiber membrane can be produced as a porous membrane. The porous membrane to be produced in the invention may be a flat membrane or the like other than a hollow membrane, and the form of the membrane is not particularly limited. However, a hollow fiber membrane is suitably used particularly in water treatment.

Furthermore, a reinforcing support can be provided in the porous membrane for the improvement of the strength of the porous membrane. Examples of the reinforcing support include a hollow fiber membrane, a hollow braided cord, and a hollow knitted cord made of various fibers. Various materials can be used alone or the combination of various materials can be used. Examples of the fiber, which is used for the hollow knitted cord or the hollow braided cord, include a synthetic fiber, a semisynthetic fiber, a recycled fiber, and a natural fiber, and the form of the fiber may be any one of a monofilament, a multifilament, and spun yarn.

When the membrane-forming solution is discharged to the solidification solution as described above, the phase separation of each of the hydrophobic polymer and the hydrophilic polymer occurs as the solidification solution is diffused in the membrane-forming solution. Since the hydrophobic polymer and the hydrophilic polymer are solidified while the phase separation progresses in this way, a porous membrane having a three-dimensional network structure in which the hydrophobic polymer and the hydrophilic polymer are tangled with each other is obtained. The step proceeds to a cleaning step, which is the next step, at the time of the stop of phase separation.

<Removal Step>

In general, the porous membrane, which is formed by the above-mentioned solidification step, has a large hole diameter and potentially has high water permeability. However, since a large amount of a hydrophilic polymer in the form of a solution remains in the porous membrane, there may be a case in which sufficiently high water permeability is not easily exhibited in this state. Further, when the hydrophilic polymer is dried and hardened in the membrane, the reduction of the mechanical strength of the membrane is also caused. Accordingly, it is preferable that a removal step of eliminating the hydrophilic polymer remaining in the porous membrane be performed after the solidification step.

In the porous membrane that is obtained in the solidification step, the hydrophilic polymer remains in the membrane (porous portion) in the form of a high-concentration solution. This high-concentration hydrophilic polymer is relatively easily eliminated to some extent when the porous membrane is immersed in a cleaning solution. Accordingly, in the removal step, it is preferable to perform (i) a porous membrane-cleaning step of cleaning the porous membrane by the cleaning solution first and then to sequentially perform (ii) a step of reducing the molecular weight of the hydrophilic polymer using an oxidizing agent and (iii) a cleaning step for the hydrophilic polymer of which the molecular weight has been reduced.

(i) Porous Membrane-Cleaning Step

As long as liquid, which is clear and in which a hydrophilic polymer is dispersed or dissolved, is used as the cleaning solution used in the porous membrane-cleaning step, the cleaning solution is not particularly limited. However, it is preferable that water be used as the cleaning solution since having a high cleaning effect. Examples of water to be used include tap water, industrial water, river water, and well water, and mixtures of these waters and alcohol, inorganic salts, an oxidizing agent, a surfactant, or the like may be used. Further, a liquid mixture of water and a favorable solvent of the hydrophobic polymer can be used as the cleaning solution.

Examples of a method of cleaning a porous membrane by the cleaning solution include a method of immersing a porous membrane in a cleaning solution and a method of allowing a porous membrane to travel in a cleaning tank in which a cleaning solution is stored.

It is suitable that cleaning temperature be high to keep the viscosity of a solution of a hydrophilic polymer low and to prevent the reduction of a diffusion rate. Cleaning temperature is preferably 50° C. or more and more preferably 80° C. or more. Moreover, when cleaning is performed while the cleaning solution is boiled, cleaning with high efficiency can be performed since the outer surface of the porous membrane also can be scraped by bubbling caused by boiling.

The concentration of the hydrophilic polymer remaining in the porous membrane becomes relatively low by the porous membrane-cleaning step. It is preferable to perform (ii) the step of reducing the molecular weight of the hydrophilic polymer using an oxidizing agent in order to obtain higher cleaning effect when the concentration of the hydrophilic polymer is low as described above.

Meanwhile, a solvent, which is used in the membrane-forming solution, other than the hydrophilic polymer also remains in the porous membrane that is formed by the solidification step, but the solvent remaining in the porous membrane is eliminated by the porous membrane-cleaning step.

(ii) Step of Reducing Molecular Weight of Hydrophilic Polymer Using Oxidizing Agent A method of allowing a chemical solution, which contains an oxidizing agent, to be held in the porous membrane first and heating the porous membrane, which holds the chemical solution, in a gaseous phase is preferable as the reduction of the molecular weight of the hydrophilic polymer.

Ozone, hydrogen peroxide, permanganate, dichromate, persulfate or the like also can be used as the oxidizing agent, but hypochlorite is particularly preferable in terms of strong oxidizing power, excellent degradability, excellent handleability, a low price, and the like. Examples of hypochlorite include sodium hypochlorite and calcium hypochlorite, but sodium hypochlorite is particularly preferable.

In this case, the temperature of the chemical solution is preferably 50° C. or less and more particularly 30° C. or less. If the temperature of the chemical solution is higher than 50° C., oxidative decomposition is facilitated during the immersion of the porous membrane and a hydrophilic polymer separated into the chemical solution is further decomposed by oxidization. For this reason, the oxidizing agent is wasted. Meanwhile, if the temperature of the chemical solution is excessively low, oxidative decomposition is suppressed but costs or the like required for controlling a temperature to a low temperature tend to increase in comparison with the case of room temperature. Accordingly, in this regard, the temperature of the chemical solution is preferably 0° C. or more and more preferably 10° C. or more.

When the porous membrane is heated in a gaseous phase after the chemical solution is held in the porous membrane, the hydrophilic polymer is decomposed by oxidization. According to the heating of the porous membrane in a gaseous phase, the chemical solution held in the porous membrane is hardly diluted significantly or the chemical solution is hardly separated and eluted into a heating medium and the oxidizing agent present in the chemical solution is efficiently used for the decomposition of the hydrophilic polymer remaining in the porous membrane. For this reason, the heating of the porous membrane in a gaseous phase is preferable.

A method of heating the porous membrane by using a heating fluid under the atmospheric pressure is preferable as a specific heating method. It is preferable that a fluid having a high relative humidity is used as the heating fluid, that is, heating be performed under a wet heat condition since the drying of an oxidizing agent such as hypochlorite can be prevented and efficient decomposition treatment can be performed. In this case, the relative humidity of the fluid is preferably 80% or more and more preferably 90% or more, and it is most preferable that the relative humidity of the fluid be close to 100%.

The lower limit of heating temperature is preferably 50° C. and more preferably 80° C. since treatment time can be shortened when continuous treatment is performed. It is preferable that the upper limit of temperature be 100° C. in the atmospheric pressure.

(iii) Cleaning Step for Hydrophilic Polymer which is Reduced the Molecular Weight After (ii) the step of reducing the molecular weight of the hydrophilic polymer using an oxidizing agent is performed, the hydrophilic polymer which is reduced the molecular weight is eliminated. Example of a method of eliminating the hydrophilic polymer include a method of cleaning the porous membrane by a cleaning solution under the same condition as the above-mentioned (i) porous membrane-cleaning step.

Meanwhile, when the hydrophilic polymer still remains even though (iii) the cleaning step for the hydrophilic polymer of which the molecular weight has been reduced is performed, (iv) a depressurization step of depressurizing the outer peripheral side of the porous membrane may be further performed.

When the outer peripheral side of the porous membrane is depressurized, the pressure of the outer peripheral side of the porous membrane becomes lower than the pressure of the inner peripheral side of the porous membrane and the hydrophilic polymer remaining in the porous membrane moves to the outer peripheral side due to a pressure difference. Accordingly, it is possible to more effectively eliminate the hydrophilic polymer.

<Heating Step>

The porous membrane from which the hydrophilic polymer has been eliminated is dried in a heating step.

The heating step includes a water reduction step of reducing moisture contained in the porous membrane.

Here, the heating step will be described with reference to the drawings. Meanwhile, components, which are illustrated in FIGS. 2 to 6 and correspond to an embodiment illustrated in FIG. 1, will be represented by the same reference numerals as the reference numerals of FIG. 1, and the detailed description thereof will be omitted.

FIG. 1 is a schematic diagram illustrating an example of a drying device of a porous membrane according to a first aspect of the invention. The drying device 10 of this example includes a water reduction unit (water reduction means) 12 that reduces moisture contained in a porous membrane 11 from which a hydrophilic polymer has been eliminated, and a final drying unit (low-temperature drying means) 13 that is provided on the downstream side of the water reduction unit 12 and dries the porous membrane 11 at a low temperature.

It is preferable that the water reduction unit 12 reduce moisture (reduce water) contained in the porous membrane 11 by treating the porous membrane 11 at a high temperature so that the temperature, particularly, the surface temperature of the porous membrane 11 is maintained at a temperature lower than the heat deformation temperature of a membrane material (a material forming the porous membrane). In terms of being capable of further shortening drying time, it is more preferable that the temperature of a drying atmosphere in the water reduction unit 12 be equal to or higher than the heat deformation temperature of the membrane material.

Here, "the heat deformation temperature of the membrane material" is temperature where the magnitude of deflection of a specimen reaches a certain value when the temperature of the specimen is raised while a load determined according to a test method standard is applied to the specimen, and is measured by a test method determined according to ASTM D648/0.46 MPa.

A reduction rate of the amount of permeated water is calculated by the following formula (1). Further, the amount of water permeating the porous membrane before and after drying treatment and a method of drying the porous membrane are as follows:

Reduction rate of the amount of permeated water (%)={(the amount of water permeating porous membrane before drying treatment–the amount of water permeating porous membrane after drying treatment)/the amount of water permeating porous membrane before drying treatment}× 100   (1)

Measurement of the amount of water permeating porous membrane before drying treatment:

First, an undried porous membrane having a length of 110 mm is collected, a needle of which an end is flat and which is made of stainless steel is inserted into a hollow portion of one end of the undried porous membrane by about 20 mm, a hollow cord having a diameter of about 2 mm is wound on the outer peripheral surface of the porous membrane corresponding to the inserted portion at a position distant from an end of the membrane by 10 mm so that the outer periphery of the needle and the inner wall surface of the hollow portion of the porous membrane come into close contact with each other, and both ends of the hollow cord are fixed while tension of about 1 to 5 N is applied to the hollow braided cord.

Next, the other open end of the porous membrane is clamped by a clamp so that the hollow portion is sealed. The position of the clamp is set so that a distance between the position where the hollow cord is wound and a sealing point is 100 mm. Further, pure water having a temperature of about 25° C. is injected into the hollow portion through the needle. Injection pressure is adjusted by a pressure-regulating valve so as to be 0.1 MPa at a position that is distant from the root of the needle by 15 mm. When one minute has passed from the start of the injection of pure water, water flowing out of the membrane is collected for one minute and the mass of the collected water is measured. The measured mass is referred to as the amount of water permeating the porous membrane before the drying treatment.

Drying Method:

A K-type thermocouple having a diameter of 1 mm is inserted into the hollow portion of the undried porous membrane by about 90 mm.

Next, the undried porous membrane which is inserted the thermocouple d is installed in a duct that has a diameter of 47 mm and is connected to a hot air outlet of the drying device of which the temperature is raised to a preset temperature. Then, the undried porous membrane is dried.

Measurement of the amount of water permeating porous membrane after drying treatment:

In order to make water flowing conditions be the same as those before the drying treatment, treatment for hydrophilizing the porous membrane is performed in the following manner before the amount of permeated water is measured.

That is, the porous membrane taken out of the drying device is immersed in hydrophilizing liquid while driving air of the hollow portion out, and is kept for five minutes. Next, the porous membrane is pulled up from the hydrophilizing liquid, the hydrophilizing liquid of the hollow portion is allowed to sufficiently flow out, the porous membrane is cleaned in the flowing water (pure water having room temperature) for about 30 minutes, and the hydrophilizing liquid of the porous layer is substituted with pure water.

After the above-mentioned hydrophilizing treatment is performed, the amount of permeated water is measured in the same manner as the measurement of the amount of water permeating the porous membrane before the drying treatment and the measured amount of permeated water is referred to as the amount of water permeating the porous membrane after the drying treatment.

The heat deformation temperature of the membrane material is likely to depend on the kind or concentration of a hydrophobic polymer, which is contained in a membrane-forming raw material used for the formation of the porous membrane, membrane-forming conditions, or the like.

The water reduction unit 12 illustrated in FIG. 1 includes a first drying unit 12a that reduces water from the porous membrane 11 by allowing the porous membrane 11 to come into contact with a flowing heating medium, membrane-surface-temperature measurement means (measurement unit) 12b for measuring the surface temperature of the porous membrane 11 immediately after the porous membrane 11 passes through the first drying unit 12a (that is, the porous membrane 11 positioned between the water reduction unit 12 and the final drying unit 13 immediately after water is reduced), and control means (first controller) 12c for controlling the temperature and/or the flow speed of the heating medium in the water reduction unit 12 according to results of the membrane-surface-temperature measurement means 12b.

It is preferable that the first drying unit 12a reduce water from the porous membrane 11 so that the temperature, particularly, the surface temperature of the porous membrane 11 is maintained at a temperature lower than the heat deformation temperature of the membrane material when the porous membrane 11 passes through the inside of the first drying unit 12a. In this case, in terms of being capable of further shortening drying time, it is more preferable that the temperature of a drying atmosphere be equal to or higher than the heat deformation temperature of the membrane material.

In order to reduce water from the porous membrane 11 under these conditions, it is necessary to heat the porous membrane 11 by allowing a heating medium, which has a temperature exceeding the heat deformation temperature of the membrane material, specifically, satisfies the relation of the following formula (a), to flow in the first drying unit 12a so that the heating medium comes into contact with the porous membrane 11.

$$t_{gh} > T_d \tag{a}$$

In formula (a), $t_{gh}$ represents the temperature of the heating medium used in the water reduction step (water reduction unit) and $T_d$ represents the heat deformation temperature of the membrane material (a material forming the porous membrane).

Examples of the heating medium include superheated vapor, hot air (high-temperature air), and high-temperature gas such as high-temperature inert gas. Among them, superheated vapor, particularly, superheated vapor having a temperature of 170° C. or more is preferable in terms of high drying capacity and the shortening of drying time.

It is preferable that the temperature of the heating medium be equal to or higher than the melting point of the membrane material. For example, the temperature of the heating medium is preferably 160° C. or more and more preferably 170° C. or more.

The membrane-surface-temperature measurement means 12b measures the surface temperature of the porous membrane 11 immediately after the reduction of water.

The membrane-surface-temperature measurement means 12b is provided with a non-contact type thermometer such as an infrared thermometer.

The control means 12c controls the temperature and/or the flow speed of the heating medium so that the temperature (surface temperature) of the porous membrane 11 measured by the membrane-surface-temperature measurement means 12b is maintained at a temperature lower than the heat deformation temperature of the membrane material, specifically, the relation of the above formula (a) is satisfied.

The control means 12c is provided with a heater or a heat exchanger for controlling the temperature of the heating medium and a fan (air blower) or a blower for controlling the flow speed of the heating medium.

Since the control means 12c is connected to the first drying unit 12a through circulation lines 12d and 12e, the heating medium is circulated between the first drying unit 12a and the control means 12c. Specifically, the heating medium of which the temperature or the flow speed has been controlled by the control means 12c is supplied to the first drying unit 12a through the circulation line 12d, the heating medium discharged from the first drying unit 12a is supplied to the control means 12c through the circulation line 12e, the temperature or the flow speed of the heating medium is controlled, and the heating medium is supplied to the first drying unit 12a again.

Meanwhile, since an intake port (not illustrated) through which outside air is taken is formed at the control means 12c or a heating medium generator (not illustrated) is mounted on the control means 12c, a fresh heating medium can be supplied to the first drying unit 12a.

A method of controlling the flow speed or the temperature of the heating medium is not particularly limited. However, for example, the first drying unit 12a is provided with a thermocouple thermometer measuring the temperature of the atmosphere to measure a drying atmosphere, is provided with a non-contact type temperature to measure the surface temperature of the porous membrane, and controls the flow speed of the heating medium or the temperature of the heating medium so that the temperature of a drying atmosphere is equal to or higher than the heat deformation temperature of the membrane material while the surface temperature of the porous membrane present in the first drying unit 12a is maintained at a temperature lower than the heat deformation temperature of the membrane material, specifically, the relation of the above formula (a) is satisfied.

The final drying unit 13 further dries the porous membrane 11 at a low temperature so that the temperature of a drying atmosphere is equal to or lower than the heat deformation temperature of the membrane material.

To further dry the porous membrane 11 at a low temperature so that the temperature of a drying atmosphere is equal to or lower than the heat deformation temperature of the membrane material, it is necessary to heat the porous membrane 11 with the heating medium and to allow the temperature of the heating medium to satisfy the relation of the following formula (b).

$$t_{sh} \leq T_a \tag{b}$$

In formula (b), $t_{sh}$ represents the temperature of the heating medium used in a final drying step (final drying unit) and $T_d$ represents the heat deformation temperature of the membrane material.

The final drying unit 13 illustrated in FIG. 1 includes a second drying unit 13a that finally dries the porous membrane 11 by allowing the porous membrane 11 to come into contact with a flowing heating medium, membrane-surface-temperature measurement means 13b for measuring the surface temperature of the porous membrane 11 immediately after the porous membrane 11 passes through the second drying unit 13a (that is, immediately after the porous membrane 11 is finally dried), and control means (second controller) 13c for controlling the temperature and/or the flow speed of the heating medium in the final drying unit 13 according to results of the membrane-surface-temperature measurement means 13b. Further, it is preferable that the final drying unit 13 include a control mechanism (not illustrated) for regulating the tension of the porous membrane 11.

The second drying unit 13a dries the porous membrane 11 at a low temperature so that the temperature of a drying atmosphere is equal to or lower than the heat deformation temperature of the membrane material when the porous membrane 11 which was reduced water at a high temperature by the first drying unit 12a passes through the inside of the second drying unit 13a.

In order to dry the porous membrane 11 under these conditions, it is necessary to allow a heating medium, which has a temperature equal to or lower than the heat deformation temperature of the membrane material, specifically, satisfies the relation of the following formula (b), to flow in the second drying unit 13a so that the heating medium comes into contact with the porous membrane 11.

Examples of the heating medium include superheated vapor, hot air (high-temperature air), and high-temperature gas such as high-temperature inert gas. It is preferable that the temperature of the heating medium be 120° C. or less.

The membrane-surface-temperature measurement means 13b measures the surface temperature of the porous membrane 11 immediately after final drying.

The membrane-surface-temperature measurement means 13b is provided with a non-contact type thermometer such as an infrared thermometer.

The control means 13c controls the temperature and/or the flow speed of the heating medium so that the relation of the above formula (b) is satisfied.

The control means 13c is provided with a heater or a heat exchanger for controlling the temperature of the heating medium and a fan (air blower) or a blower for controlling the flow speed of the heating medium.

Since the control means 13c is connected to the second drying unit 13a through circulation lines 13d and 13e, the heating medium is circulated between the second drying unit 13a and the control means 13c. Specifically, the heating medium which was controlled the temperature or the flow speed by the control means 13c is supplied to the second drying unit 13a through the circulation line 13d, the heating medium discharged from the second drying unit 13a is supplied to the control means 13c through the circulation line 13e, the temperature or the flow speed of the heating medium is controlled, and the heating medium is supplied to the second drying unit 13a again.

Meanwhile, since an intake port (not illustrated) through which outside air is taken is formed at the control means 13c or a heating medium generator (not illustrated) is mounted on the control means 13c, a fresh heating medium can be supplied to the second drying unit 13a.

A method of controlling the flow speed or the temperature of the heating medium is not particularly limited. However, for example, the second drying unit 13a is provided with a thermocouple thermometer measuring the temperature of the atmosphere to measure a drying atmosphere, and controls the flow speed of the heating medium or the temperature of the heating medium so that the temperature of a drying atmosphere in the second drying unit 13a is equal to or lower than the heat deformation temperature of the membrane material, specifically, the relation of Formula (b) is satisfied.

The control mechanism (not illustrated) regulates the tension of the porous membrane 11.

The control mechanism is provided with a drive roller of which torque can be controlled, a dancer roller that can apply a constant load, or the like.

In the heating step using the above-mentioned drying device 10, after water is reduced from the porous membrane 11 under the high-temperature atmosphere by the water reduction unit 12 (water reduction step), the porous membrane 11 is dried under the low-temperature atmosphere by the final drying unit 13 (final drying step).

(Water Reduction Step)

In the water reduction step, first, water is reduced from the porous membrane 11, which passes through the first drying unit 12a, at a high temperature by the water reduction unit 12 so that the temperature of the porous membrane 11 is maintained at a temperature lower than the heat deformation temperature of the membrane material. For example, a heating medium, which has a temperature exceeding the heat deformation temperature of the membrane material, specifically, satisfies the relation of the above formula (a), is allowed to flow in the first drying unit 12a, and the heating medium is allowed to come into contact with the porous membrane 11. At that time, the control means 12c controls the temperature of the heating medium and/or the flow speed of the heating medium according to the surface temperature of the porous membrane 11 that is measured immediately after the water reduction step by the membrane-surface-temperature measurement means 12b, specifically, controls the temperature of the heating medium and/or the flow speed of the heating medium so that the surface temperature of the porous membrane 11 is maintained at a temperature lower than the heat deformation temperature of the membrane material. In this case, in terms of being capable of further shortening drying time, it is more preferable that the temperature of a drying atmosphere be equal to or higher than the heat deformation temperature of the membrane material.

It is preferable that the maximum surface temperature of the porous membrane in the water reduction step be lower than the heat deformation temperature ($T_d$) of the membrane material.

Meanwhile, the temperature of the heating medium at the time of the reduction of water is appropriately determined in a range that is equal to or higher than the heat deformation temperature of the membrane material, specifically, is determined so as to satisfy the relation of the above formula (a). However, it is preferable that the temperature of the heating medium at the time of the reduction of water be equal to or higher than the melting point of the membrane material.

Further, it is preferable that the flow speed of the heating medium be 4 m/s or more. As the flow speed becomes higher, it is possible to reduce the moisture of the porous membrane 11 in a shorter time while the temperature of the porous membrane 11 is maintained at a temperature lower than the heat deformation temperature of the membrane material. However, if the flow speed is excessively high, the porous membrane 11 shakes in the drying unit. For this reason, the porous membrane 11 comes into contact with a wall or porous membranes come into contact with each other when a plurality of porous membranes is treated at the same time. Accordingly, there is a concern that the surface of the porous membrane 11 may be damaged. Furthermore, since the moisture of the porous membrane 11 is too quickly reduced when the temperature of the heating medium at the time of the water reduction step is high, there is a case in which it is difficult to stably maintain and control the temperature of the porous membrane 11 at a temperature lower than the heat deformation temperature of the membrane material. Accordingly, it is preferable that the flow speed be 60 m/s or less. Further, it is more preferable that the flow speed be 30 m/s or less since the temperature of the porous membrane 11 can be stably maintained and controlled at a temperature lower than the heat deformation temperature of the membrane material, a damage to a portion to be dried caused by shaking can be prevented, and water can be uniformly reduced from the porous membrane 11.

Furthermore, the flowing direction of the heating medium is not particularly limited, and may be a direction orthogonal to the traveling direction of the porous membrane 11 that travels in the first drying unit 12a and may be a direction parallel to the traveling direction of the porous membrane 11. However, water reduction efficiency tends to increase when the flowing direction of the heating medium is a direction orthogonal to the traveling direction of the porous membrane if the flow speed is constant. It is preferable that the heating medium flow at an angle of 45° or more with respect to the traveling direction of the porous membrane 11.

In the water reduction step, it is preferable the moisture of the porous membrane be reduced until the moisture content of the porous membrane reaches at least 70% or less of initial moisture content, but it is more preferable that the moisture of the porous membrane be reduced at a high temperature until the moisture content of the porous membrane from which moisture has been reduced reaches 10 to 20%. When the moisture content of the porous membrane is lower than 10%, the surface temperature of the porous membrane rises suddenly. For this reason, there is a concern that the surface temperature of the porous membrane may exceed the heat deformation temperature of the membrane material before the temperature of the heating medium is controlled. Meanwhile, if the reduction of water is completed when the moisture content of the porous membrane exceeds 20%, time required for low-temperature drying in the following final drying step is lengthened.

In order to reduce water at a high temperature until the moisture content of the porous membrane reaches a value within the above-mentioned range, it is necessary to adjust the temperature or the flow speed of the heating medium or to regulate the time of stay of the porous membrane in the water reduction unit by adjusting the traveling speed of the porous membrane.

(Final Drying Step)

In the final drying step, after the water reduction step, the porous membrane 11, which passes through the second drying unit 13a, is dried at a low temperature by the final drying unit 13 so that the temperatures of a drying atmosphere is equal to or lower than the heat deformation temperature of the membrane material. For example, a heating medium, which has a temperature equal to or lower than the heat deformation temperature of the membrane material, specifically, satisfies the relation of the above formula (b), is allowed to flow in the second drying unit 13a, and the heating medium is allowed to come into contact with the porous membrane 11. At that time, it is preferable that the control means 13c control the temperature and/or the flow speed of the heating medium, which is used in the final drying step, according to the surface temperature of the porous membrane 11 that is measured immediately after the final drying step by the membrane-surface-temperature measurement means 13b.

It is preferable that the maximum surface temperature of the porous membrane in the final drying step satisfy the relation of the following formula (c).

$$T_{gh} < T_{sh} < T_d \quad (c)$$

In formula (c), $T_{gh}$ represents the maximum surface temperature of the porous membrane in the water reduction step, $T_{sh}$ represents the maximum surface temperature of the porous membrane in the final drying step, and $T_d$ represents the heat deformation temperature of the membrane material.

Meanwhile, the temperature of the heating medium at the time of final drying is appropriately determined in ranges that is equal to or lower than the heat deformation temperature of the membrane material, specifically, is determined so as to satisfy the relation of the above formula (b). However, it is preferable that the temperature of the heating medium at the time of final drying be 120° C. or more.

Further, it is preferable that the flow speed of the heating medium be 4 m/s or more. As the flow speed becomes higher, it is possible to reduce the moisture of the porous membrane 11 in a shorter time while the temperature of the porous membrane 11 is maintained at a temperature equal to or lower than the heat deformation temperature of the membrane material. However, if the flow speed is excessively high, the porous membrane 11 shakes in the drying unit. For this reason, the porous membrane 11 comes into contact with a wall or porous membranes come into contact with each other when a plurality of porous membranes is treated at the same time. Accordingly, there is a concern that the surface of the porous membrane 11 may be damaged. Therefore, it is preferable that the flow speed be 60 m/s or less. Furthermore, it is more preferable that the flow speed be 30 m/s or less since the temperature of the porous membrane 11 can be stably maintained and controlled at a temperature equal to or lower than the heat deformation temperature of the membrane material, a damage to a portion to be dried caused by shaking can be prevented, and water can be uniformly reduced from the porous membrane 11.

Further, the flowing direction of the heating medium is not particularly limited, and may be a direction orthogonal to the traveling direction of the porous membrane 11 that travels in the second drying unit 13a and may be a direction parallel to the traveling direction of the porous membrane 11. However, drying efficiency tends to increase when the flowing direction of the heating medium is a direction orthogonal to the traveling direction of the porous membrane if the flow speed is constant. It is preferable that the heating medium flow at an angle of 45° or more with respect to the traveling direction of the porous membrane 11.

In the final drying step, it is preferable that the porous membrane be dried at a low temperature until the moisture content of the porous membrane after the completion of drying (that is, after the heating step) reaches 1% or less and preferably a value lower than 1%. If low-temperature drying is completed when the moisture content of the porous membrane exceeds 1%, drying is insufficient. For this reason, when the porous membrane is wound on a bobbin or the like, porous membranes are likely to be fixed while adhering to each other. Accordingly, in the invention, a state in which the moisture content of the porous membrane is 1% or less and is preferably lower than 1% is regarded as a state in which drying is completed.

In order to perform low-temperature drying until the moisture content of the porous membrane reaches 1% or less and preferably a value lower than 1%, it is necessary to adjust the temperature or the flow speed of the heating medium or to regulate the time of stay of the porous membrane in the final drying unit by adjusting the traveling speed of the porous membrane.

Further, in the final drying step, it is preferable that the porous membrane be dried at a low temperature so that the reduction rate of the amount of permeated water after the completion of drying (that is, the heating step) can be suppressed to 30% or less. If the reduction rate of the amount of permeated water exceeds 30%, there is a concern that the amount of filtered liquid is significantly reduced when liquid is filtered by the membrane. Accordingly, in the invention, it is preferable that the porous membrane be dried so that the reduction rate of the amount of permeated water can be suppressed to 30% or less.

In order to perform low-temperature drying so that the reduction rate of the amount of permeated water can be suppressed to 30% or less, it is necessary to adjust the temperature or the flow speed of the heating medium or to regulate the time of stay of the porous membrane in the final drying unit by adjusting the traveling speed of the porous membrane.

Furthermore, in the final drying step, it is preferable that the porous membrane be dried while the tension of the porous membrane is regulated. In the final drying step, it is expected that the temperature of the porous membrane rise particularly after the moisture content of the porous membrane is reduced to 1% or less. In that case, thermal shrinkage stress is generated, and contact pressure on a guide surface is increased when a guide is used in the final drying step. For this reason, there is a concern that the surface of the porous membrane may be crushed. From that viewpoint, in the final drying step, it is preferable that the porous membrane be dried while the tension of the porous membrane is regulated.

The porous membrane dried by the above-mentioned heating step is wound on a bobbin or the like, and is stored and transported.

According to the method for producing a porous membrane of the invention, as described above, in the heating step, water is reduced from the porous membrane at a high temperature so that the temperature of the porous membrane is maintained at a temperature lower than the heat deformation temperature of the membrane material, specifically, water is reduced from the porous membrane at a high temperature with a heating medium satisfying the relation of the above formula (a). Accordingly, it is possible to efficiently dry the porous membrane in a short time without requiring large facilities. The reason for this is considered as follows.

In the past, there has been a concern that the surface of a porous membrane is softened or damaged by heat when the porous membrane is dried under a situation where the temperature of a drying atmosphere exceeds the heat deformation temperature of a membrane material. For this reason, there has been no concept that a porous membrane is dried under a situation where the temperature of a drying atmosphere exceeds the heat deformation temperature of a membrane material, specifically, there has been no concept that a porous membrane is dried with a heating medium satisfying the relation of the above formula (a).

However, the inventors have focused attention on the fact that temperature hardly rises since water takes the heat of a portion coming into contact with water during the evaporation of water. Further, water is present on the surface or porous portions of a porous membrane and water present in the porous portions moves to the surface of the porous membrane and evaporate when drying treatment is performed. Accordingly, inner portions of the porous membrane start to be dried, and the surface of the porous membrane is dried at the last. Therefore, even though the porous membrane is dried under a situation where the temperature of a drying atmosphere exceeds the heat deformation temperature of the membrane material, specifically, the porous membrane is dried with a heating medium satisfying the relation of the above formula (a), the surface temperature of the porous membrane hardly rises while water evaporates and while the temperature, specifically, the surface temperature of a porous membrane is maintained at a temperature lower than the heat deformation temperature of a membrane material. For this reason, it is considered that the surface of a porous membrane is hardly softened or damaged by heat. Accordingly, according to the invention, it is possible to shorten drying time since a porous membrane is dried at a high temperature in comparison with the past. Further, large facilities are also not required.

Furthermore, if the final drying step is performed after the water reduction step as described above when drying is not completed even though the surface temperature of the porous membrane rises suddenly during the water reduction step and reaches a temperature equal to or higher than the heat deformation temperature of the membrane material, a drying temperature drops. Accordingly, the surface temperature of the porous membrane also drops. Therefore, it is possible to sufficiently dry the porous membrane while suppressing the softening and damage of the surface of the porous membrane caused by heat.

Other Embodiments

The method for producing a porous membrane of the invention is not limited to the above-mentioned method.

For example, in the above-mentioned heating step, the final drying step is performed after the water reduction step. However, if drying is completed in the water reduction step, that is, if the moisture content of the porous membrane reaches a value lower than 1% by the reduction of water performed while the temperature of the porous membrane is maintained at a temperature lower than the heat deformation temperature of the membrane material, the final drying step may not be performed.

Further, in the drying device 10 illustrated in FIG. 1, a heating medium controlled to a predetermined temperature is flowed in the first and second drying units 12a and 13a, the heating medium is come into contact with the porous membrane 11, and water is reduced from the porous membrane and the porous membrane is dried at a low temperature. However, for example, jackets may be provided at the outer peripheral portions of these drying units and a heating medium may flow in the jacket so that a drying atmosphere in the drying unit is controlled to reach a predetermined temperature, and the porous membrane may be dried under the controlled drying atmosphere.

Figure 2:
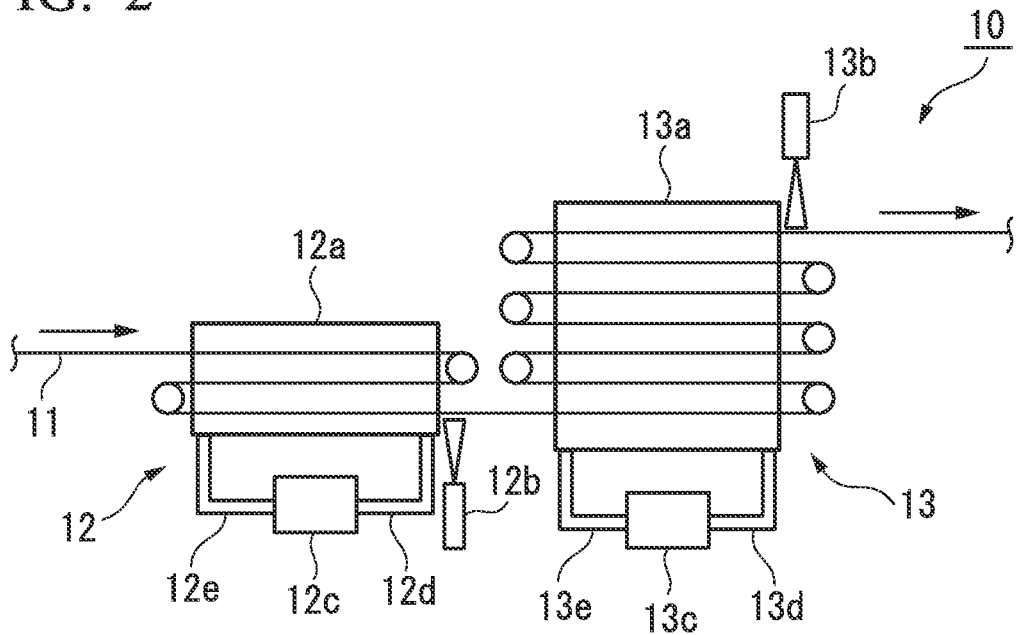
FIG. 2 is a schematic diagram illustrating another example of the drying device of the invention.

Furthermore, in the drying device 10, the porous membrane 11 is passed through the first and second drying units 12a and 13a without reciprocating. However, for example, as illustrated in FIG. 2, the porous membrane 11 may reciprocate plural times in the first and second drying units 12a and 13a. Meanwhile, since it is possible to efficiently dry a porous membrane in a short time in the invention, the number of times of reciprocation is reduced in comparison with a method in the related art.

Figure 3:
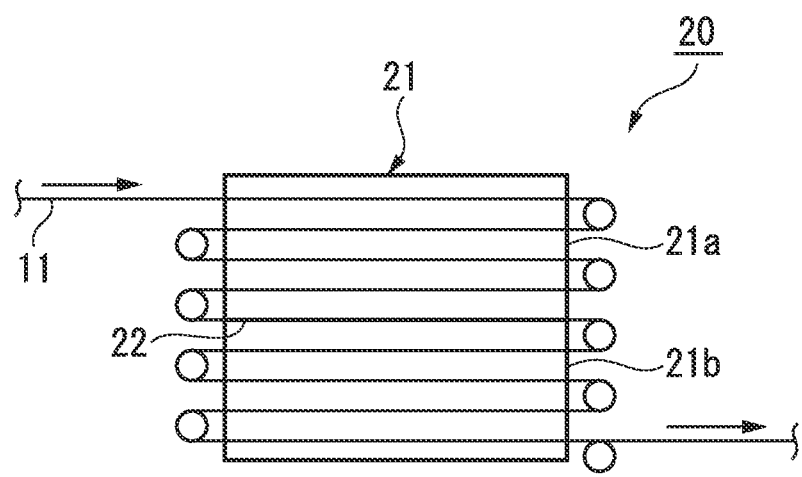
FIG. 3 is a schematic diagram illustrating another example of the drying device of the invention.

Further, a drying device used in the heating step is not limited to the drying devices 10 illustrated in FIGS. 1 and 2. For example, the water reduction unit 12 and the final drying unit 13 are independent of each other in the drying device 10. However, there may be used a drying device 20 in which an inner portion of one drying unit 21 is partitioned into two portions by a partition plate 22 as illustrated in FIG. 3, the upstream portion functions as a water reduction unit 21a for reducing water from the porous membrane 11 at a high temperature, and the downstream portion functions as a final drying unit 21b for reducing water from the porous membrane 11 at a low temperature. The drying device 20 is a so-called cogeneration-type drying device that can recover exhaust heat discharged from the water reduction unit 21a and use the heat to heat a heating medium in the final drying unit 21b.

Figure 4:
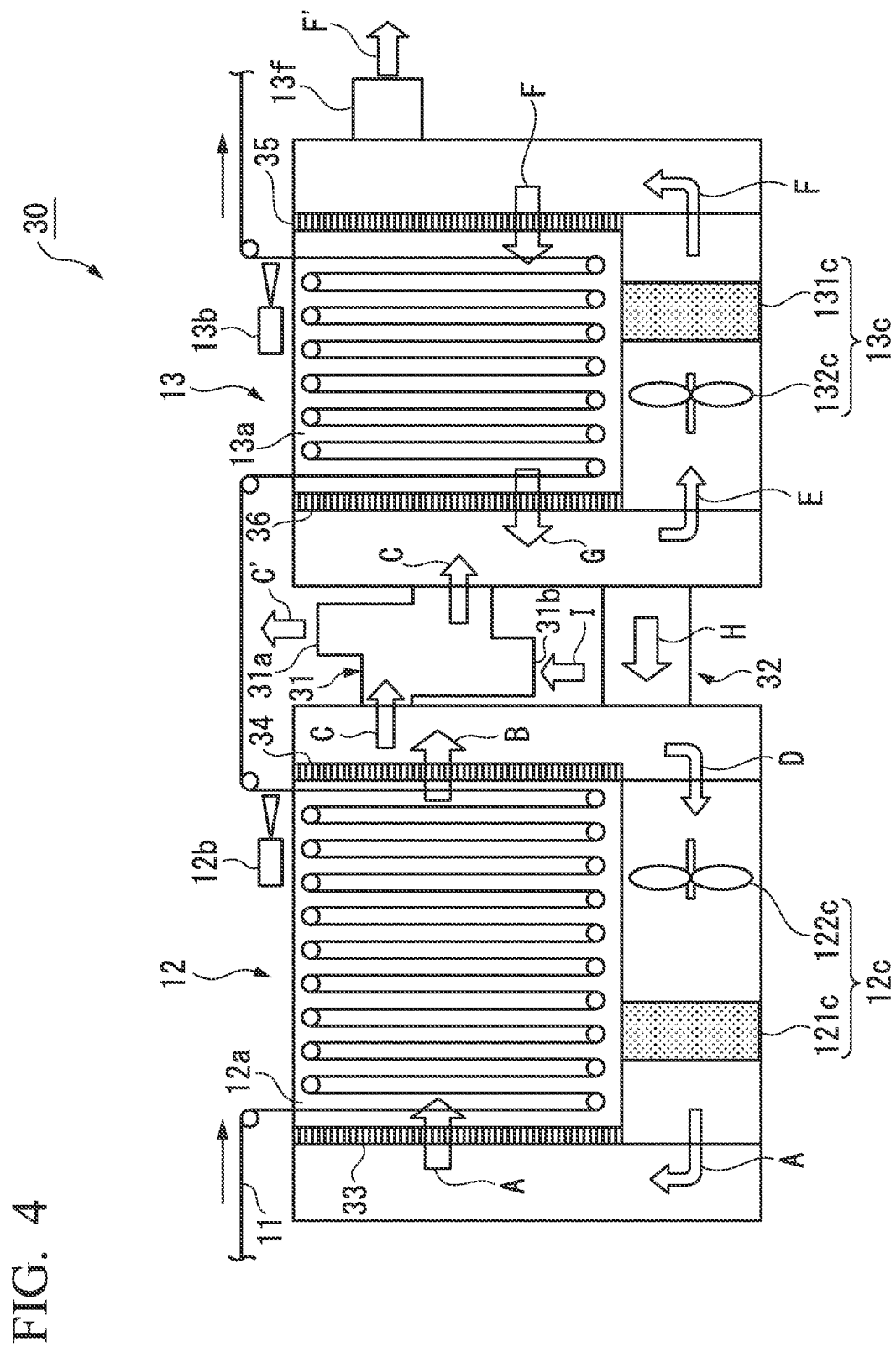
FIG. 4 is a schematic diagram illustrating another example of the drying device of the invention.

Furthermore, a drying device 30 illustrated in FIG. 4 may be used.

A water reduction unit 12 and a final drying unit 13 of the drying device 30 illustrated in FIG. 4 are connected to each other by connection means 31 and 32.

In the drying device 30 illustrated in FIG. 4, side surfaces, which correspond to an inlet and an outlet for a porous membrane 11, among side surfaces of first and second drying units 12a and 13a are formed of honeycomb straightening members 33 to 36, respectively. Accordingly, a heating medium can enter and exit from the first and second drying units 12a and 13a. Here, the flow of the heating medium will be described.

First, a heating medium of which the temperature and the flow speed have been controlled by control means 12c including an electric heater 121c and a fan 122c passes through the first straightening member 33 and is supplied to the first drying unit 12a as illustrated by arrows A. Further, the heating medium, which was used to reduce water from the porous membrane 11, passes through the second straightening member 34 as illustrated by arrow B, and a part of the heating medium is sent to the final drying unit 13 through the first connection means 31 as illustrated by arrows C. At that time, a part of the heating medium, which is supplied to the final drying unit 13, is exhausted to the outside of a system from an exhaust port 31a as illustrated by arrow C'. On the other hand, the rest of the heating medium having passed through the second straightening member is returned to the control means 12c as illustrated by arrow D, and is supplied to the first drying unit 12a again after the temperature and the flow speed of the heating medium are controlled.

The heating medium sent to the final drying unit 13 from the water reduction unit 12 is sent to control means 13c as illustrated by arrow E. Then, after the temperature and the flow speed of the heating medium are controlled by a vapor heater 131c and a fan 132c that are included in the control means 13c, the heating medium passes through the third straightening member 35 and is supplied to the second drying unit 13a as illustrated by arrows F. Further, the heating medium, which was used for the low-temperature drying of the porous membrane 11, passes through the fourth straightening member 36 as illustrated by arrow G and a part of the heating medium is sent to the water reduction unit 12 through the second connection means 32 as illustrated by arrow H. On the other hand, the rest of the heating medium having passed through the fourth straightening member 36 is returned to the control means 13c as illustrated by arrow E, and is supplied to the second drying unit 13a again after the temperature and the flow speed of the heating medium are controlled.

Meanwhile, a part of the heating medium, which was controlled by the control means 13c, is exhausted to the outside of the system from an exhaust port 13f as illustrated by arrow F'. Further, a fresh heating medium is taken into the system from an intake port 31b, which is formed at the first connection means 31, as illustrated by arrow I.

The heating medium sent to the water reduction unit 12 from the final drying unit 13 is returned to the control means 12c as illustrated by arrow D, and is supplied to the first drying unit 12a again after the temperature and the flow speed of the heating medium are controlled.

Since the heating medium circulates between the water reduction unit 12 and the final drying unit 13 as described above, the drying device 30 illustrated in FIG. 4 is also a cogeneration-type drying device that reuses exhaust heat.

Further, a drying device of a porous membrane according to a second aspect of the invention includes a water reduction unit that reduces moisture contained in a porous membrane, and a final drying unit that is provided in the downstream of the water reduction unit and dries the porous membrane. The final drying unit includes a control mechanism that regulates the tension of the porous membrane.

Since the water reduction unit, the final drying unit, and the control mechanism included in the drying device of a porous membrane according to the second aspect of the invention are the same as the water reduction unit, the final drying unit, and the control mechanism included in the drying device of a porous membrane according to the first aspect of the invention, the description thereof will be omitted.

EXAMPLES

The invention will be specifically described using examples, but the invention is not limited to these examples.

Example 1-1

Solidification Step 12 parts by mass of polyvinylidene fluoride A (manufactured by Atofina Japan K.K., trade name: KYNAR 301F), 8 parts by mass of polyvinylidene fluoride B (manufactured by Atofina Japan K.K., trade name: KYNAR 9000LD), 10 parts by mass of polyvinylpyrrolidone (manufactured by ISP Co., Ltd., trade name: K-90), and 70 parts by mass of N,N-dimethylacetamide (DMAc) were mixed to prepare a membrane-forming solution (1).

3 parts by mass of polyvinylidene fluoride A, 2 parts by mass of polyvinylidene fluoride B, 2 parts by mass of polyvinylpyrrolidone, and 93 parts by mass of DMAc were mixed to separately prepare a membrane-forming solution (2).

Incidentally, there was prepared a nozzle (see FIG. 1 of JP 2005-42074 A) where a hollow portion is formed at the center thereof and annular discharge ports are sequentially formed doubly outside the hollow portion so as to be capable of sequentially applying two kinds of liquid. While the nozzle was kept warm at 30° C., a multifilament single braided cord (multifilament; 830T/96F, 16 punches) made of polyester was introduced into the hollow portion as a reinforcing support and the membrane-forming solution (2) and the membrane-forming solution (1) were sequentially applied to the outer periphery of the multifilament single braided cord from the inside and were solidified in a solidification solution (a liquid mixture of 5 parts by mass of N,N-dimethylacetamide and 95 parts by mass of water) kept warm at 80° C. A porous membrane, which includes one fractional layer near the outer surface thereof and in which the braided cord is coated with a porous layer having an inclined structure in which the diameter of a hole increases toward the inside, was obtained in this way. Meanwhile, a main solution, which forms the membrane structure of the porous membrane, of the applied membrane-forming solutions (1) and (2) is the membrane-forming solution (1) that is applied to the outside.

Moreover, there was prepared a nozzle (see FIG. 1 of JP 2005-42074 A) where a hollow portion having an inner diameter larger than the outer diameter of the porous membrane is formed at the center thereof and annular discharge ports are sequentially formed doubly outside the hollow portion so as to be capable of sequentially applying two kinds of liquid. While the nozzle was kept warm at 30° C., the porous membrane obtained as described above was introduced into the hollow portion and the glycerin (first class manufactured by Wako Pure Chemical Industries, Ltd.) and the membrane-forming solution (1) were sequentially applied to the outer periphery of the porous membrane from the inside and were solidified in the solidification solution that was the same as the solidification solution used above and was kept warm at 80° C. A porous membrane, which includes a braided cord support further coated with a porous layer in the form of a two-layer structure, was obtained in this way.

A spinning speed (the traveling speed of the porous membrane) at this time was 8.8 m/min.

<Removal Step>

The following steps (i) to (iii) were repeated on the porous membrane, which was obtained in this way, two times to perform a removal step of removing a hydrophilic polymer.

(i) Porous Membrane-Cleaning Step

The porous membrane was cleaned by being immersed in a cleaning tank, which contained boiling water having a temperature of 100° C., under a condition of the time of stay of 5 minutes.

(ii) Step of Reducing Molecular Weight of Hydrophilic Polymer Using Oxidizing Agent Next, the porous membrane was immersed in a tank, which contained an aqueous solution of hypochlorite having a temperature of 30° C. and a concentration of 60000 mg/L, under a condition of the time of stay of 1 minute. After that, the porous membrane was heated in the wet heat having a temperature of 85° C. and a relative humidity 100% under a condition of the time of stay of 3 minutes, so that the molecular weight of a hydrophilic polymer was reduced.

(iii) Cleaning Step for Hydrophilic Polymer which is Reduced the Molecular Weight After that, the porous membrane was cleaned again under the same condition as (i).

<Heating Step>

(Drying Method)

Figure 5:
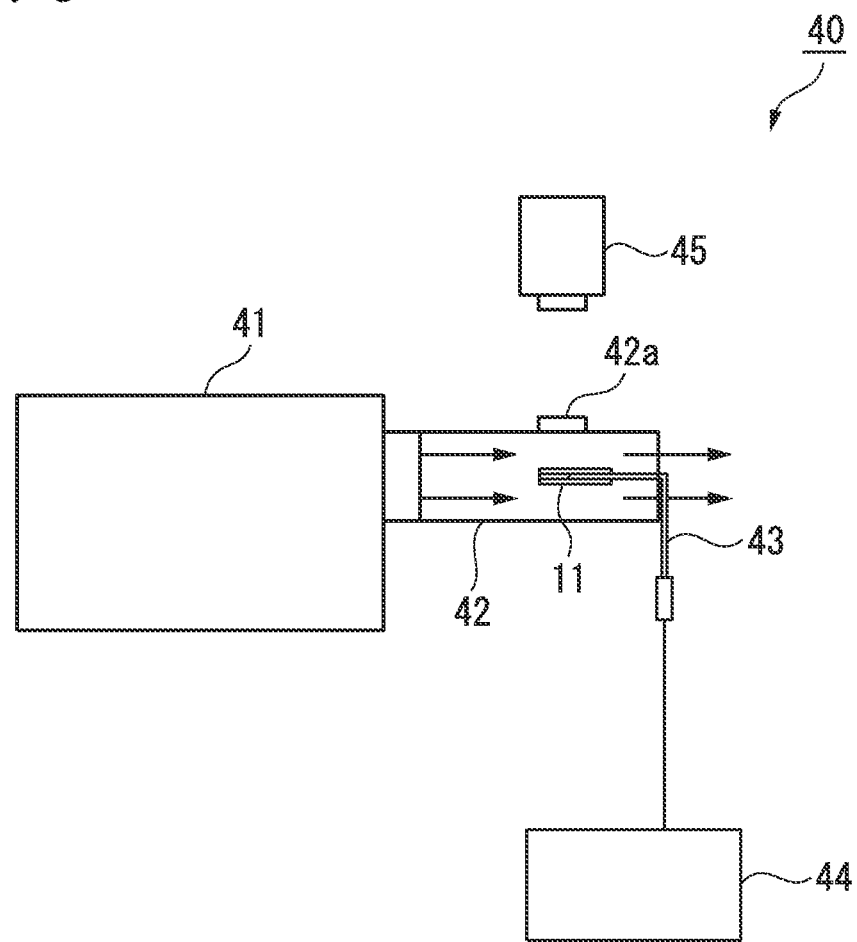
FIG. 5 is a schematic diagram illustrating a drying device used in Example 1-1, Comparative example 1-1, Examples 2-1 and 2-2, and Comparative example 2-1.

An undried porous membrane was dried in the following manner by a drying device 40 that is illustrated in FIG. 5 and includes a hot air generator 41 and a drying pipe (sanitary pipe) 42 connected to the hot air generator 41.

First, one end of a thermocouple 43 was inserted into the porous membrane 11 cut into a length of 11 cm. The porous membrane 11 was inserted into a drying pipe 42 so that the longitudinal direction of the porous membrane 11 was parallel to the flowing direction of hot air (heating medium). A temperature-measurement window 42a was formed at a part of the peripheral surface of the drying pipe 42, and the porous membrane 11 was inserted so as to reach the position of the window 42a. Meanwhile, an instrument 44 such as a data logger is connected to the other end of the thermocouple 43, so that the internal temperature of the porous membrane can be measured. Further, an infrared thermometer 45 is installed above the temperature-measurement window 42a, so that the surface temperature of the porous membrane can be measured.

(Measurement of the Amount of Water Permeating Porous Membrane after Drying Treatment)

In order to make water flowing conditions be the same as those before the drying treatment, treatment for hydrophilizing the porous membrane was performed in the following manner before the amount of permeated water is measured.

That is, the porous membrane taken out of the drying device was immersed in hydrophilizing liquid (an aqueous solution of 0.3 mass % of "Olfine EXP4036" manufactured by Nissin Chemical Industry Co., Ltd.) while driving air of the hollow portion out, and was kept for five minutes. Next, the porous membrane was pulled up from the hydrophilizing liquid, the hydrophilizing liquid of the hollow portion was allowed to sufficiently flow out, the porous membrane was cleaned in the flowing water (pure water having room temperature) for about 30 minutes, and the hydrophilizing liquid of the porous layer was substituted with pure water.

After the above-mentioned hydrophilizing treatment was performed, the amount of permeated water was measured in the same manner as the measurement of the amount of water permeating the porous membrane before the drying treatment and the measured amount of permeated water was referred to as the amount of water permeating the porous membrane after the drying treatment.

(Calculation of Reduction Rate of the Amount of Permeated Water)

The reduction rate of the amount of permeated water was calculated by the following formula (1).

Reduction rate of the amount of permeated water (%)={(the amount of water permeating porous membrane before drying treatment−the amount of water permeating porous membrane after drying treatment)/the amount of water permeating porous membrane before drying treatment}×100     (1)

The heat deformation temperature ($T_d$) of the membrane material was measured by a test method determined according to ASTM D648/0.46 MPa, and was 130° C.

Figure 7:
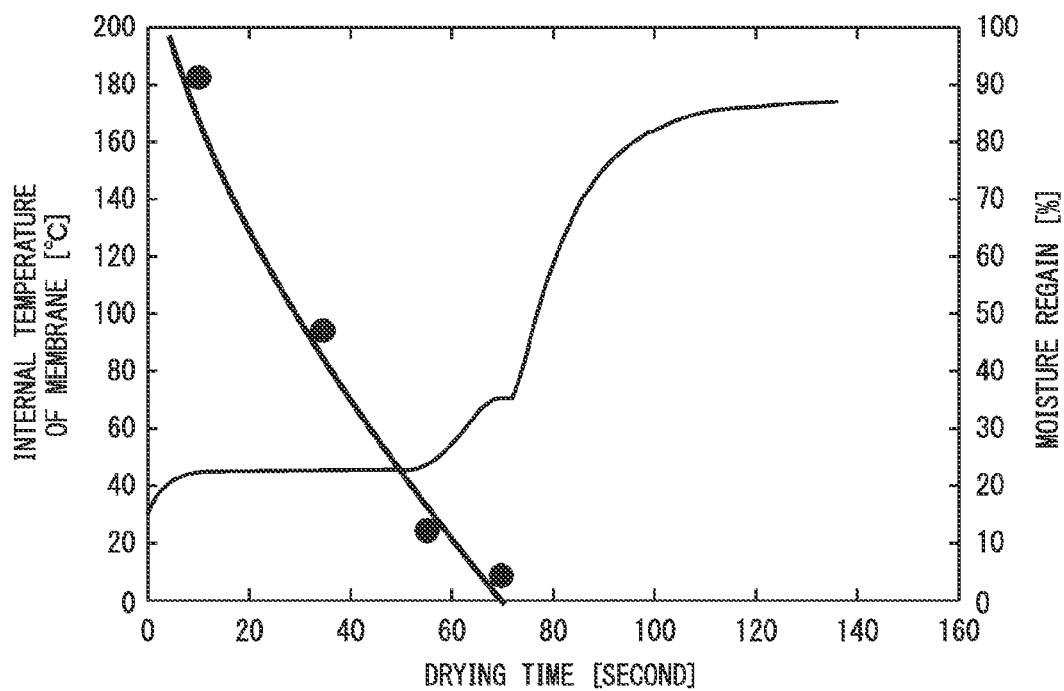
FIG. 7 is a graph illustrating results of Example 1-1.

The porous membrane having been subjected to a step of removing a hydrophilic polymer was dried by the above-mentioned drying method under conditions of the wind speed of hot air (heating medium) of 13 m/s and a temperature ($t_{gh}$) of 175° C. (water reduction step), and the internal temperature of the porous membrane was measured over time. Further, the moisture content of the porous membrane was measured when drying time was 10 seconds, 35 seconds, 55 seconds, and 70 seconds. These results are illustrated in FIG. 7. Furthermore, drying-completion time is illustrated in Table 1.

Meanwhile, the moisture content of the porous membrane was measured in the following manner.

Measurement of Moisture Content:

The moisture content of the porous membrane was measured using an infrared moisture meter (manufactured by Kett Electric Laboratory, "type: FD-720").

Meanwhile, the moisture content output from the moisture meter is defined as "{(mass of porous membrane containing moisture−mass of dried porous membrane)/mass of dried porous membrane}×100".

Comparative Example 1-1

Figure 8:
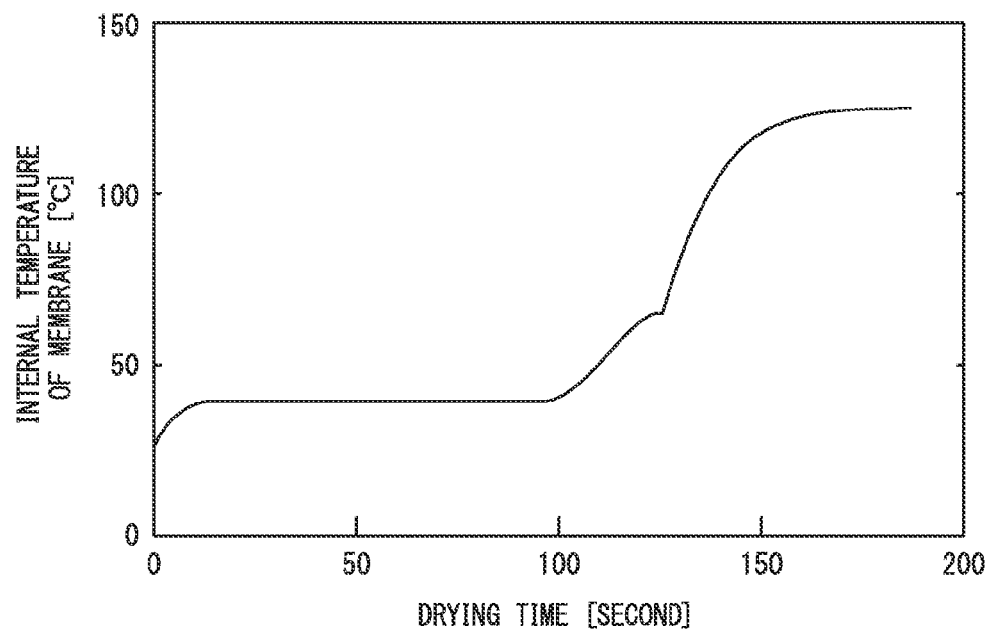
FIG. 8 is a graph illustrating results of Comparative example 1-1.

The porous membrane was dried in the same manner as Example 1-1 except that the wind speed of hot air was changed to 13 m/s and the temperature ($t_{gh}$) was changed to 125° C. (water reduction step), and the internal temperature of the porous membrane was measured over time. Results are illustrated in FIG. 8. Further, drying-completion time is illustrated in Table 1.

TABLE 1

| | Conditions of heating medium | | | |
|---|---|---|---|---|
| | Wind speed [m/s] | Temperature [° C.] | Direction with respect to porous membrane | Drying-completion time [second] |
| Example 1-1 | 13 | 175 | Parallel | 70 |
| Comparative Example 1-1 | 13 | 125 | Parallel | 125 |

As apparent from Table 1 and FIG. 7, in the case of Example 1-1, the internal temperature of the porous membrane was maintained at about 45° C. while the moisture content of the porous membrane is reduced to about 15% from 90%. Then, when the moisture content was lower than about 15%, the internal temperature of the porous membrane started to rise (first inflection point). When the internal temperature was about 70° C., the moisture content was 0%, that is, drying was completed. Time required for the drying of the porous membrane (drying-completion time) was about 70 seconds. When the appearance of the porous membrane at this time was visually observed, defects, such as softening or damages, could not be confirmed with eyes.

Meanwhile, when hot air was applied to the porous membrane even after drying was completed, the internal temperature of the porous membrane further rose (second inflection point). When the internal temperature was about 170° C., the internal temperature became substantially constant. From this result, it was found that drying was completed when the internal temperature of the porous membrane reached the second inflection point.

Further, when the internal temperature of the porous membrane was measured and the surface temperature was measured by the infrared thermometer, the surface temperature had the same tendency as the internal temperature at a temperature higher than the internal temperature by about 5° C. Accordingly, until the internal temperature of the porous membrane reached the second inflection point, the surface temperature of the porous membrane was maintained at a temperature lower than the heat deformation temperature of the membrane material.

Furthermore, drying treatment was separately performed under the same conditions. Then, when the internal temperature of the porous membrane reached about 70° C., the amount of water permeating the porous membrane was measured in the same manner as the measurement of the amount of water permeating the porous membrane after the drying treatment described above and the reduction rate of the amount of permeated water was calculated. The reduction rate of the amount of permeated water was 7%.

Moreover, drying treatment was separately performed under the same conditions. Then, when the internal temperature of the porous membrane reached about 170° C., the amount of water permeating the porous membrane was measured in the same manner as the measurement of the amount of water permeating the porous membrane after the drying treatment described above and the reduction rate of the amount of permeated water was calculated. The reduction rate of the amount of permeated water was 35%.

When the temperature of the porous membrane was 70° C., the reduction rate of the amount of permeated water was maintained at 30% or less. However, when the temperature of the porous membrane was 170° C., the reduction rate of the amount of permeated water reached 30% or more.

Further, as apparent from FIG. 8, in Comparative example 1-1 in which the water reduction step was performed at the temperature of a drying atmosphere lower than the heat deformation temperature of the membrane material, drying-completion time (that is, time required until the internal temperature of the porous membrane reached the second inflection point) was about 125 seconds and was longer than the drying-completion time of Example 1-1.

Furthermore, drying treatment was separately performed under the same conditions. Then, when the internal temperature of the porous membrane reached about 120° C., the amount of water permeating the porous membrane was measured in the same manner as the measurement of the amount of water permeating the porous membrane after the drying treatment described above and the reduction rate of the amount of permeated water was calculated. The reduction rate of the amount of permeated water was 23%. The reduction rate of the amount of permeated water was maintained at 30% or less.

Example 2-1

Figure 9:
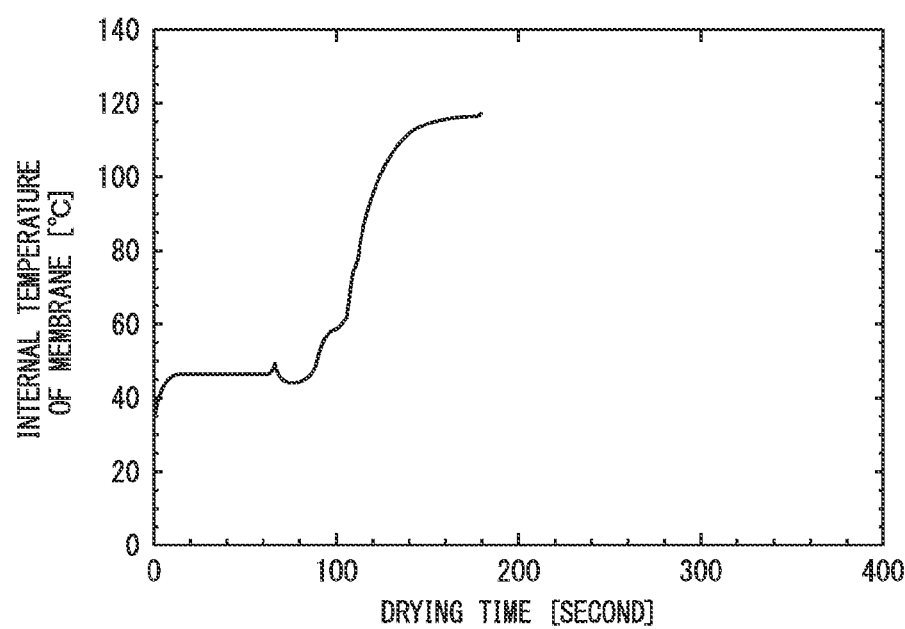
FIG. 9 is a graph illustrating results of Example 2-1.

The porous membrane was dried in the same manner as Example 1-1 (water reduction step). When 65 seconds had passed, the wind speed of hot air was changed to 4 m/s, the temperature ($t_{sh}$) was changed to 120° C., the porous membrane was further dried (final drying step), and the internal temperature of the porous membrane was measured over time. Results are illustrated in FIG. 9. Further, drying-completion time is illustrated in Table 2.

Example 2-2

Figure 10:
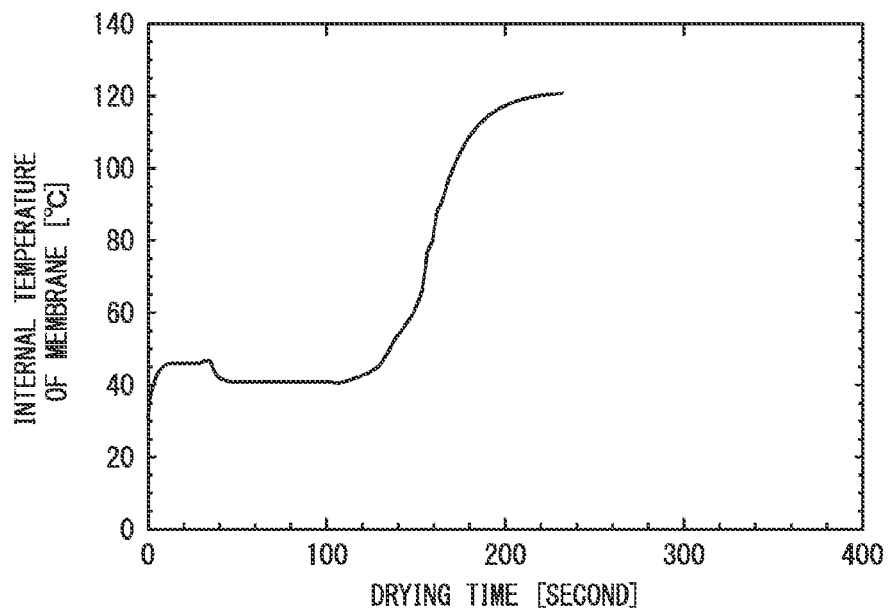
FIG. 10 is a graph illustrating results of Example 2-2.

The porous membrane was dried (water reduction step) in the same manner as Example 1-1. When 35 seconds had passed, the wind speed of hot air was changed to 4 m/s, the temperature ($t_{sh}$) was changed to 120° C., the porous membrane was further dried (final drying step), and the internal temperature of the porous membrane was measured over time. Results are illustrated in FIG. 10. Further, drying-completion time is illustrated in Table 2.

Comparative Example 2-1

Figure 11:
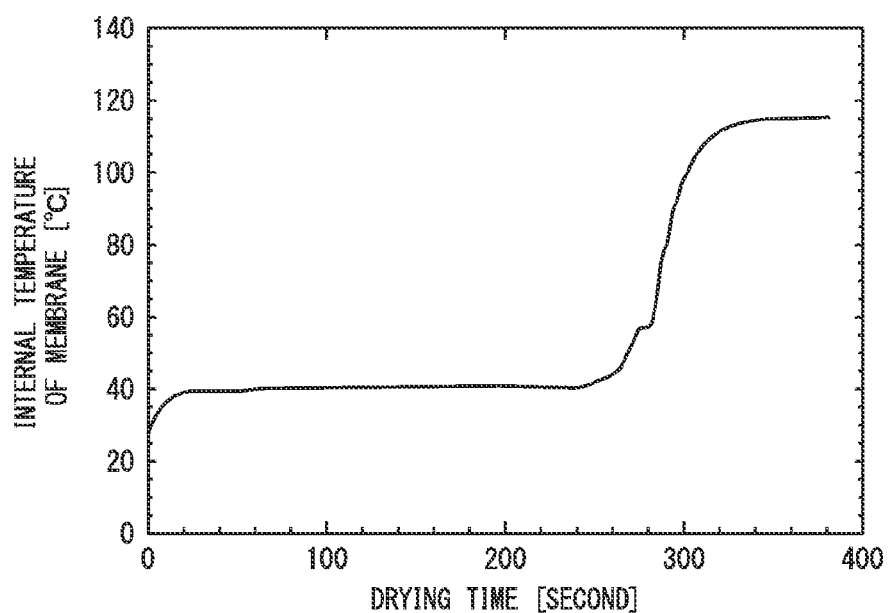
FIG. 11 is a graph illustrating results of Comparative example 2-1.

The porous membrane was dried in the same manner as Example 1-1 except that the wind speed of hot air was changed to 4 m/s and the temperature ($t_{gh}$) was changed to 120° C. (water reduction step), and the internal temperature of the porous membrane was measured over time. Results are illustrated in FIG. 11. Further, drying-completion time is illustrated in Table 2.

TABLE 2

| | Conditions of heating medium | | | |
|---|---|---|---|---|
| | Wind speed [m/s] | Temperature [° C.] | Direction with respect to porous membrane | Drying-completion time [second] |
| Example 2-1 | 13→4 | 170→120 | Parallel | 100 |
| Example 2-2 | 13→4 | 170→120 | Parallel | 150 |
| Comparative Example 2-1 | 4 | 120 | Parallel | 280 |

As apparent from Table 2 and FIGS. 9 and 10, in the cases of Examples 2-1 and 2-2 in which the final drying step was performed after the water reduction step, the internal temperature of the porous membrane was lowered once when a step proceeded to the final drying step from the water reduction step. However, the internal temperature of the porous membrane changed substantially in the same pattern as Example 1-1. Further, drying in Example 2-1, in which the water reduction step was performed for 65 seconds, was completed earlier than that in Example 2-2, in which the water reduction step was performed for 35 seconds, by about 50 seconds.

Since the change of the internal temperature of the porous membrane in Examples 2-1 and 2-2 had the same tendency as that in Example 1-1 as described above, it was easily inferred that the moisture content of the porous membrane, the reduction rate of the amount of permeated water, and the surface temperature also have the same tendency as Example 1-1. Accordingly, the moisture content and the surface temperature were not measured.

Further, as apparent from FIG. 11, in Comparative example 2-1 in which the water reduction step was performed at the temperature of a drying atmosphere lower than the heat deformation temperature of the membrane material, drying-completion time (that is, time required until the internal temperature of the porous membrane reached the second inflection point) was about 280 seconds and was longer than the drying-completion time of Examples 1-1, 2-1, and 2-2.

Example 3-1

Figure 6:
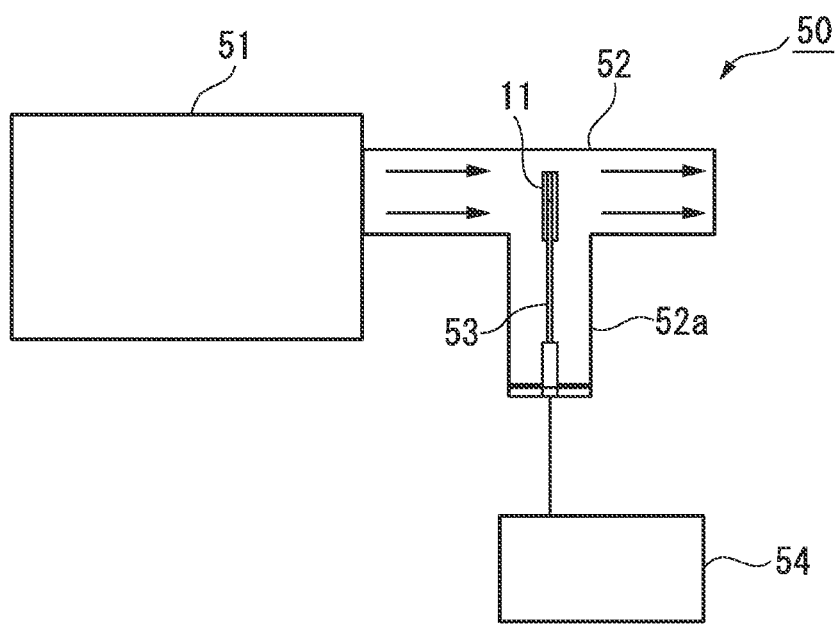
FIG. 6 is a schematic diagram illustrating a drying device used in Example 3-1 and Comparative example 3-1.

A heating step was performed in the following manner by using a drying device 50, which is illustrated in FIG. 6 and includes a hot air generator 51 and a drying pipe (sanitary pipe) 52 connected to the hot air generator 51, instead of the drying device 40 illustrated in FIG. 5.

First, one end of a thermocouple 53 was inserted into the porous membrane 11 cut into a length of 11 cm. The porous membrane 11 was inserted from a branch portion 52a of the drying pipe 52 so that the longitudinal direction of the porous membrane 11 was parallel to the flowing direction of hot air (heating medium) and hot air was applied to the porous membrane 11. Meanwhile, an instrument 54 such as a data logger is connected to the other end of the thermocouple 53, so that the internal temperature of the porous membrane can be measured.

Figure 12:
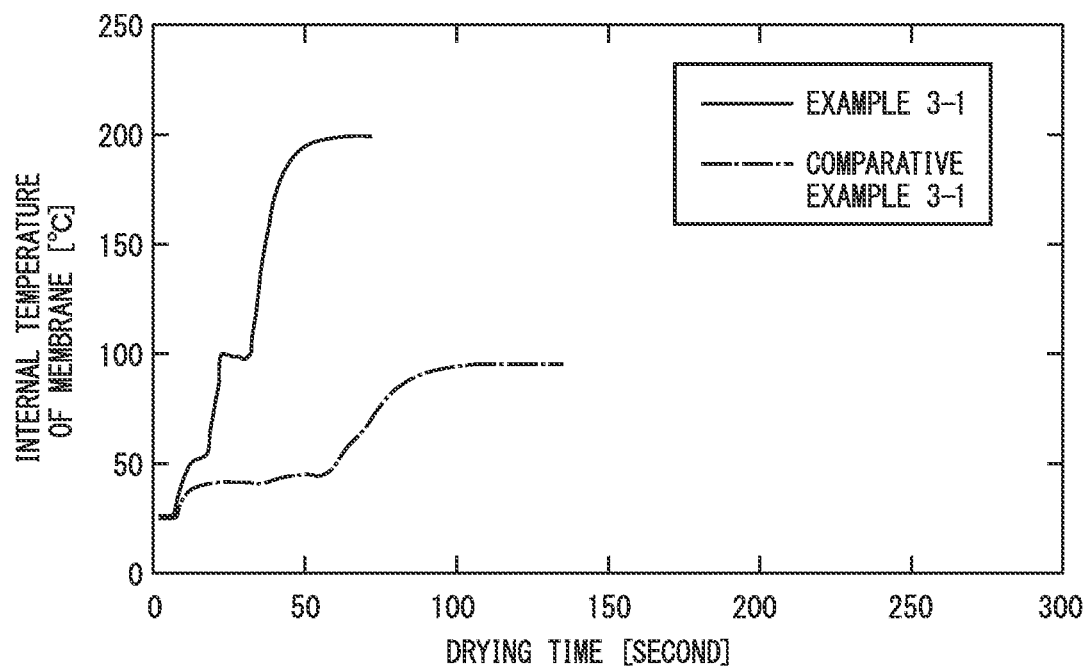
FIG. 12 is a graph illustrating results of Example 3-1 and Comparative example 3-1.

Further, the porous membrane was dried under conditions of the wind speed of hot air of 60 m/s and a temperature ($t_{gh}$) of 200° C. (water reduction step), and the internal temperature of the porous membrane was measured over time. Results are illustrated in FIG. 12. Further, drying-completion time is illustrated in Table 3.

Comparative Example 3-1

The porous membrane was dried in the same manner as Example 3-1 except that the wind speed of hot air was changed to 60 m/s and the temperature ($t_{gh}$) was changed to 100° C. (water reduction step), and the internal temperature of the porous membrane was measured over time. Results are illustrated in FIG. 12. Further, drying-completion time is illustrated in Table 3.

TABLE 3

| | Conditions of heating medium | | | |
|---|---|---|---|---|
| | Wind speed [m/s] | Temperature [° C.] | Direction with respect to porous membrane | Drying-completion time [second] |
| Example 3-1 | 60 | 200 | Orthogonal | 30 |
| Comparative Example 3-1 | 60 | 100 | Orthogonal | 70 |

As apparent from Table 3 and FIG. 12, in the case of Example 3-1 in which the direction of hot air applied to the porous membrane was changed to an orthogonal direction from a parallel direction, the internal temperature of the porous membrane changed in the same pattern as Example 1-1.

Since the change of the internal temperature of the porous membrane in Example 3-1 had the same tendency as that in Example 1-1 as described above, it was easily inferred that the moisture content of the porous membrane, the reduction rate of the amount of permeated water, and the surface temperature also have the same tendency as Example 1-1. Accordingly, the moisture content and the surface temperature were not measured.

Further, in Comparative example 3-1 in which the direction of hot air applied to the porous membrane was changed to an orthogonal direction from a parallel direction and the porous membrane is dried at the temperature of a drying atmosphere lower than the heat deformation temperature of the membrane material, the internal temperature of the porous membrane changed in the same pattern as Example 1-1 but drying-completion time (that is, time required until the internal temperature of the porous membrane reached the second inflection point) was about 70 seconds and was longer than the drying-completion time of Example 3-1.

INDUSTRIAL APPLICABILITY

According to the method for producing a porous membrane of the invention, it is possible to efficiently dry the porous membrane in a short time without requiring large facilities.

According to the drying device of a porous membrane of the invention, it is possible to efficiently dry the porous membrane in a short time without requiring large facilities.

EXPLANATIONS OF LETTERS OR NUMERALS

10, 20, 30, 40, 50: drying device
11: porous membrane
12: water reduction unit (water reduction means)
12a: first drying unit
12b: membrane-surface-temperature measurement means (measurement unit)
12c: control means (first controller)
13: final drying unit (low-temperature drying means)
13a: second drying unit
13b: membrane-surface-temperature measurement means
13c: control means (second controller)

The invention claimed is:
1. A method for producing a porous membrane comprising:
    a solidification step of forming a porous membrane by solidifying a membrane-forming solution by a solidification solution; and
    a heating step of drying the porous membrane,
    wherein the heating step includes at least a water reduction step of reducing moisture contained in the porous membrane,
    the water reduction step uses a heating medium that heats the porous membrane, and
    the temperature of the heating medium used in the water reduction step satisfies a relation of the following formula (a):

$$t_{gh} > T_d \quad (a)$$

In formula (a), $t_{gh}$ represents the temperature of the heating medium used in the water reduction step and $T_d$ represents the heat deformation temperature of a membrane material.

2. The method for producing a porous membrane according to claim 1,
wherein the heating step includes a final drying step of drying the porous membrane after the water reduction step,
the final drying step uses a heating medium that heats the porous membrane, and
the temperature of the heating medium used in the final drying step satisfies a relation of the following formula (b):

$$t_{sh} \leq T_d \quad \text{(b)}$$

In formula (b), $t_{sh}$ represents the temperature of the heating medium used in the final drying step and $T_d$ represents the heat deformation temperature of the membrane material.

3. The method for producing a porous membrane according to claim 1,
wherein the temperature of the heating medium used in the water reduction step is equal to or higher than a melting point of the membrane material.

4. The method for producing a porous membrane according to claim 1,
wherein the maximum surface temperature of the porous membrane in the water reduction step is lower than the heat deformation temperature ($T_d$) of the membrane material.

5. The method for producing a porous membrane according to claim 1,
wherein the water reduction step reduces moisture contained in the porous membrane until the moisture content of the porous membrane reaches at least 70% or less of initial moisture content.

6. The method for producing a porous membrane according to claim 2,
wherein the maximum surface temperature of the porous membrane in the final drying step satisfies a relation of the following formula (c):

$$T_{gh} < T_{sh} < T_d \quad \text{(c)}$$

In formula (c), $T_{gh}$ represents the maximum surface temperature of the porous membrane in the water reduction step, $T_{sh}$ represents the maximum surface temperature of the porous membrane in the final drying step, and $T_d$ represents the heat deformation temperature of the membrane material.

7. The method for producing a porous membrane according to claim 6,
wherein the temperature of the heating medium used in the final drying step is 120° C. or less.

8. The method for producing a porous membrane according to claim 1,
wherein the moisture content of the porous membrane after the heating step is 1% or less, and a reduction rate of the amount of permeated water is 30% or less.

9. The method for producing a porous membrane according to claim 1,
wherein the surface temperature of the porous membrane after performing the water reduction step is measured, and the temperature and/or the flow speed of the heating medium used in the water reduction step are controlled according to the surface temperature of the porous membrane.

10. The method for producing a porous membrane according to claim 2,
wherein the surface temperature of the porous membrane after performing the final drying step is measured, and the temperature and/or the flow speed of the heating medium used in the final drying step are controlled according to the surface temperature of the porous membrane.

11. The method for producing a porous membrane according to claim 2,
wherein the final drying step dries the porous membrane while regulating the tension of the porous membrane.

12. A drying device of a porous membrane including a water reduction unit that reduces moisture contained in a porous membrane with a heating medium, and a final drying unit that is provided in the downstream of the water reduction unit and dries the porous membrane with the heating medium, wherein the drying device of a porous membrane comprises a membrane-surface-temperature measurement means for measuring the surface temperature of the porous membrane and provided between the water reduction unit and the final drying unit; and
a control means for controlling the temperature and/or the flow speed of the heating medium of the water reduction unit according to a measured result of the surface temperature.

13. The drying device of a porous membrane according to claim 12, further comprising:
a membrane-surface-temperature measurement means for measuring the surface temperature of the porous membrane and provided in the downstream of the final drying unit; and
a control means for controlling the temperature and/or the flow speed of the heating medium of the final drying unit according to a measured result of the surface temperature.

14. A drying device comprising:
a water reduction unit that reduces moisture contained in a porous membrane with use of a heating medium; and
a final drying unit that is provided in the downstream of the water reduction unit and dries the porous membrane,
wherein the final drying unit includes a control mechanism that regulates the tension of the porous membrane,
a temperature of the heating medium used in the water reduction step satisfies a relation of the following formula (a):

$$t_{gh} > T_d \quad \text{(a)}$$

wherein, in formula (a), $t_{gh}$ represents the temperature of the heating medium used in the water reduction step and $T_d$ represents a heat deformation temperature of a membrane material.

15. The method for producing a porous membrane according to claim 9,
wherein the surface temperature of the porous membrane after performing the final drying step is measured, and the temperature and/or the flow speed of the heating medium used in the final drying step are controlled according to the surface temperature of the porous membrane.

* * * * *